United States Patent
Cowell

[19]

[11] Patent Number: 5,909,996
[45] Date of Patent: Jun. 8, 1999

[54] WHEEL LIFT HEAD

[76] Inventor: Lowell A Cowell, P.O. Box 2066, 134 Tower La., Morgantown, W. Va. 26502

[21] Appl. No.: 08/869,002

[22] Filed: Jun. 4, 1997

[51] Int. Cl.⁶ ....................................................... B60P 3/12
[52] U.S. Cl. ........................... 414/563; 280/402; 414/428
[58] Field of Search ..................................... 414/563, 426, 414/427, 428, 429, 546, 555; 280/402; 254/8 R, 9 R

[56] References Cited

U.S. PATENT DOCUMENTS

| | | | |
|---|---|---|---|
| 3,951,280 | 4/1976 | Peck ...................................... | 414/428 X |
| 4,637,623 | 1/1987 | Bubik ................................... | 414/563 X |
| 4,871,291 | 10/1989 | Moore et al. ........................... | 414/563 |
| 4,968,052 | 11/1990 | Alm et al. ............................. | 414/563 X |
| 5,039,272 | 8/1991 | Holmes et al. ......................... | 414/563 |

*Primary Examiner*—Frank E. Werner
*Attorney, Agent, or Firm*—Sughrue, Mion, Zinn Macpeak & Seas, PLLC

[57] ABSTRACT

A wheel lift head assembly is pivotally mounted adjacent the rear end of a truck frame and is hydraulically operated for raising and lowering one end of a vehicle to be towed behind the truck. The wheel lift head assembly includes a crossbar member having a pair of hollow tubes pivotally mounted at opposite ends thereof with a pair of J-shaped wheel engaging members slidably mounted therein. A retainer is secured to an end of each J-shaped arm to prevent the withdrawal of the arm from the pivoted guide tube and a J-shaped arm provides engagement on opposite sides of the wheels of the vehicle to be towed to prevent lateral slipping of the wheels. A tiltable truck bed is mounted on the truck for pivotal movement between a horizontal position and an inclined position. At least one support post is provided at the rear of the tiltable truck bed for supporting the end of the tiltable truck bed on the ground and notches are formed in a forwardly facing surface of the support post. A locking member is pivotally mounted on the wheel lift head assembly for pivotal movement into and out of engagement with a selected notch for locking the wheel lift head assembly in the raised position.

2 Claims, 6 Drawing Sheets

WHEEL LIFT HEAD

BACKGROUND OF THE INVENTION

The present invention is directed to a wheel lift head and more specifically to an adjustable J-shaped arm pivotally mounted thereon for engagement with a wheel of a vehicle.

The use of such wheel engaging lift devices is old and well known in the art. Most of the devices utilize a substantially T-shaped boom which is pivotally mounted on the rear end of a truck and provided with a pair of L-shaped arms pivotally mounted on the crossbar of the T-shaped boom for engagement with the wheels of a vehicle to be towed. Wheel engaging members may be hydraulically or manually operated and may be detachably mounted on the boom to facilitate the storage of the boom when not in use.

A typical example of a prior art wheel lift device is disclosed in the U.S. patent to Roberts et al. (U.S. Pat. No. 5,249,909). A T-shaped boom is extendible and retractable within a guide which is pivotally mounted on the truck and the crossbar of the T-shaped support is pivotally connected to the stem. The opposite ends of the crossbar are provided with an oversized sliding member which can be locked in place as needed to adjust the width of the crossbar. The tire engaging member is pivotally mounted on the end of each sliding member and locking means are provided for locking the tire support in the operative position or a storage position. An L-shaped tire brace is removably connected to the pivoted tire support and means are provided for locking the tire brace in an adjusted position for engaging different size tires.

SUMMARY OF THE INVENTION

The present invention provides a new and improved wheel lift head comprising support means adapted to be mounted adjacent a truck rear end for supporting a wheel lift head, a support arm adjustably supported by said support means, a crossbar pivotally mounted on said support member, adjustment tubes slidably mounted on opposite ends of said crossbar, a guide tube pivotally mounted on an end of each adjustment tube outwardly of said crossbar, a J-shaped wheel engaging arm slidably supported in said guide tube, locking means for locking said guide tube in an operative position for engaging a vehicle wheel and for locking said guide tube in an inoperative storage position, first securing means for adjustably securing each adjustment tube on said crossbar, second securing means for adjustably securing said J-shaped arm in said guide tube and retaining means on said J-shaped arm to prevent withdrawal of said J-shaped arm from said guide tube.

The above and other objects, features and advantages of the present invention will be more apparent and more readily appreciated from the following detailed description of preferred exemplary embodiment of the present invention, taken in connection with the accompanying drawings.

DETAILED DESCRIPTION OF THE INVENTION

Figure 1:
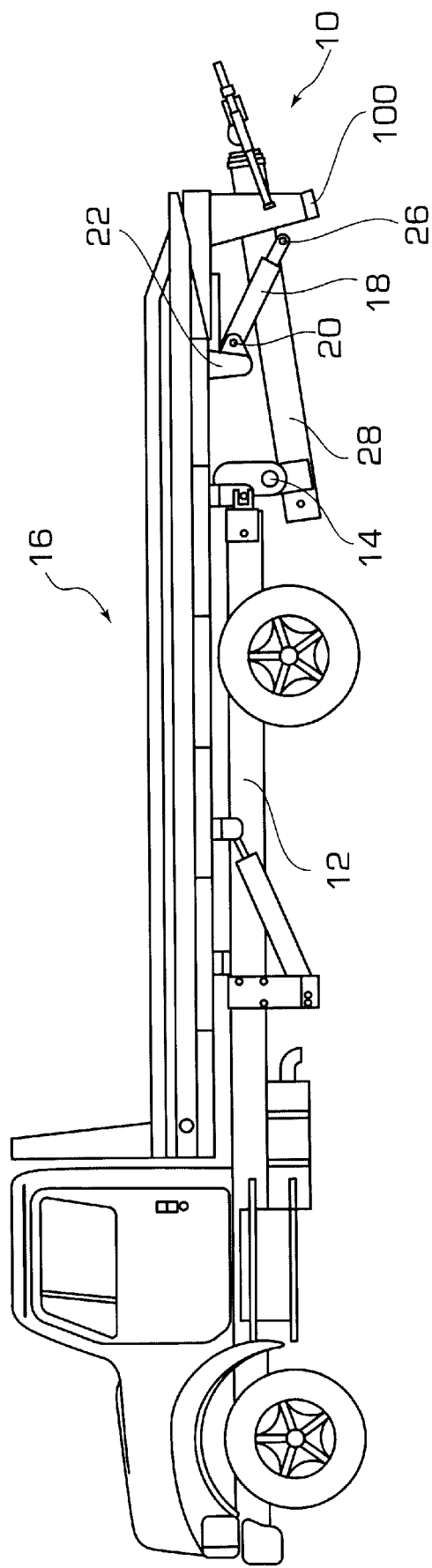
FIG. 1 is a side elevational view of a truck having a wheel lift head pivotally mounted at a rear end thereof in the raised position.

The wheel lift head assembly 10 of the present invention is pivotally mounted to the rear end of a truck frame assembly 12 by means of a pivot pin connection 14. A conventional tiltable flatbed assembly 16 is pivotally mounted on the truck frame 12 for retrieving and transporting vehicles. An hydraulic actuator 18 is pivotally mounted at 20 to a support member 22 depending from the rear of the flatbed assembly 16. The extendible arm 24 of the hydraulic actuator 18 is provided with a transversely extending arm 26 at the distal end thereof which underlies the tubular support member 28 of the wheel lift head assembly 10 for moving the wheel lift head assembly 10 between the raised position shown in FIG. 1 and the lowered position shown in FIG. 2.

Figure 3:
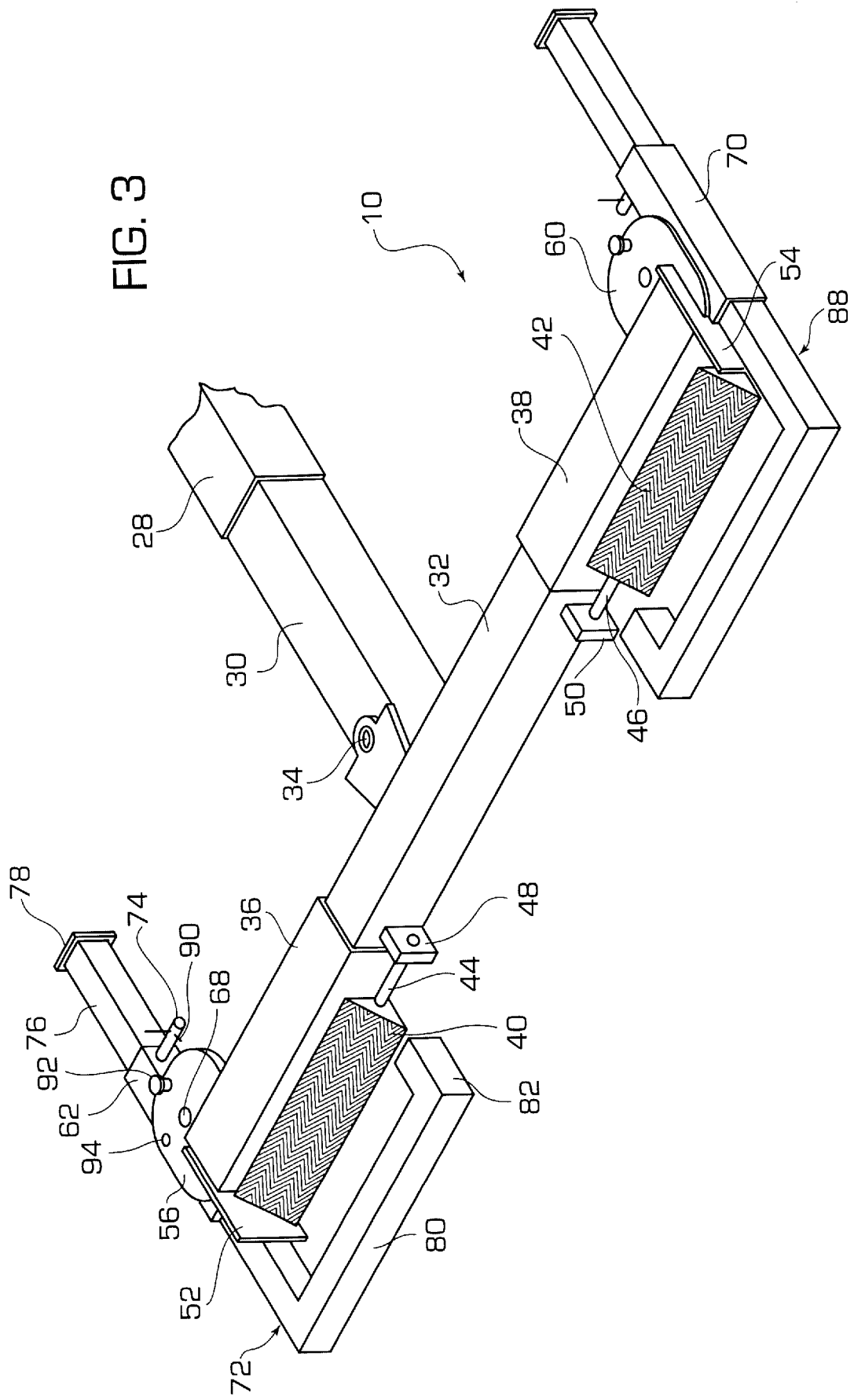
FIG. 3 is a perspective view of the wheel lift head assembly.

The wheel lift head assembly 10 is shown in perspective in FIG. 3 wherein the support arm 30 is slidably mounted within the hollow support member 28. A hollow tubular crossbar 32 is pivotally connected to the support member 30 by means of a pivotal connection 34. A pair of adjustment tubes 36 and 38 are slidably mounted on opposite ends of the crossbar 32 for adjusting the wheel lift head assembly to accommodate vehicles of various width. A pair of wheel chocks 40 and 42 are mounted on the rearwardly facing side of the adjustment tubes 36 and 38 for engaging and supporting the vehicle tires. Guide pins 44 and 46 extend from opposing ends of the wheel chocks 40 and 42 and slidably extend through apertures in guide plates 40 and 50 which are secured to the crossbar 32.

Figure 6:
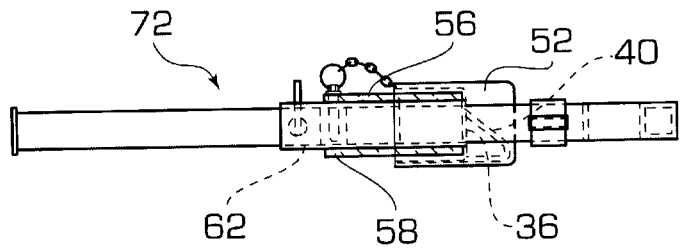
FIG. 6 is a side elevational view of the pivoted wheel engaging arm.

An end plate 52 is welded to the outer end of the tube 36 and the wheel chock 40. A similar end plate 54 is welded to the ends of the tube 38 and the wheel chock 42. A pair of parallel, spaced apart support plates 56 and 58 are welded to the end plate 52 and the tube 36 as best seen in FIGS. 3 and 6. A similar pair of parallel, spaced apart support plates are welded to the tube 38 and the end plate 54 but only one of the support plates 60 is shown in FIG. 3.

Figure 5:
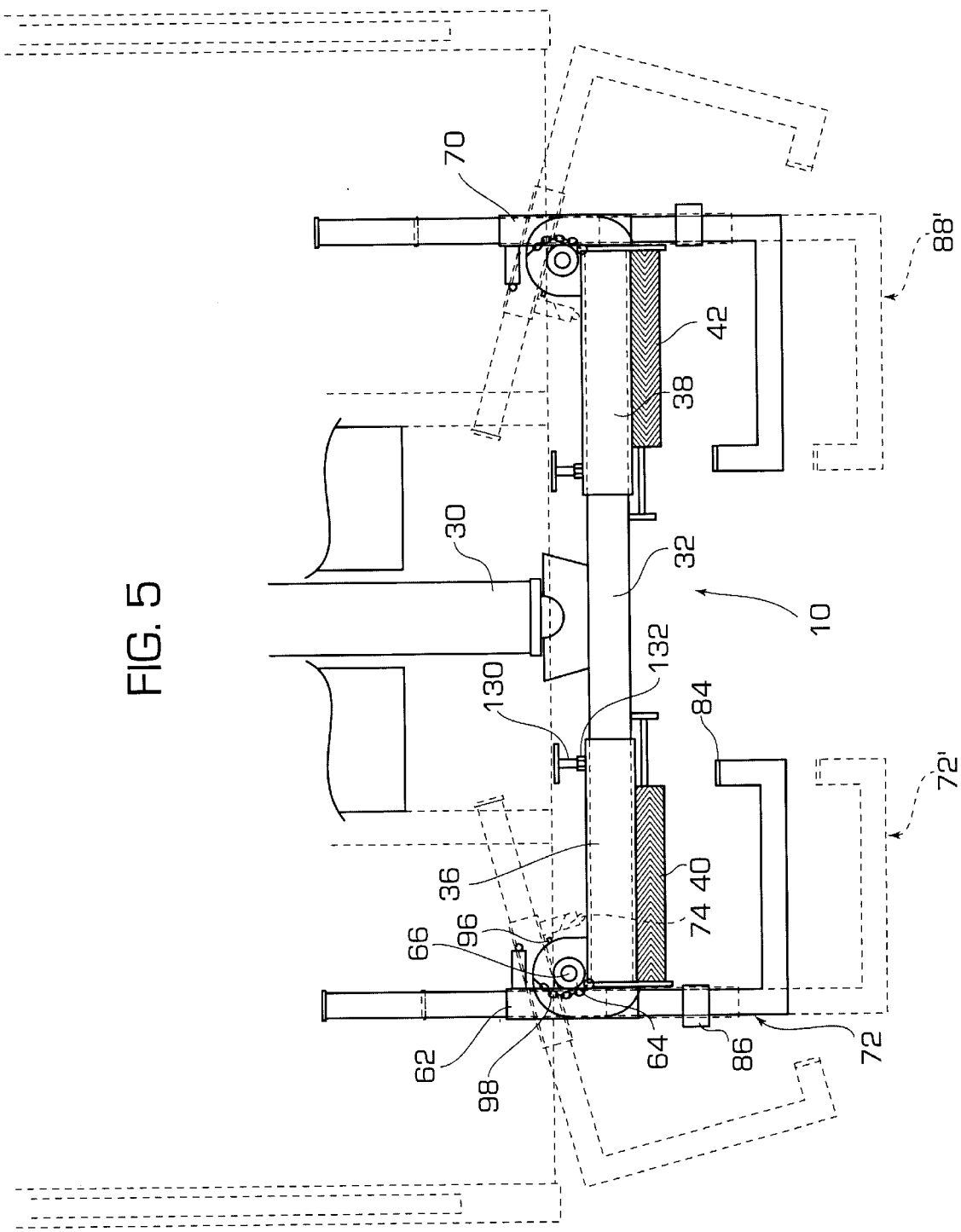
FIG. 5 is a top plan view of the wheel lift head assembly with the wheel engaging member shown in solid lines in the wheel engaging position and in phantom lines in the disengaged position.

A hollow guide tube 62 is pivotally connected to the support plates 56 and 58 and is located between the support plates. As best seen in FIG. 5, a swivel lug 64 is welded to the guide tube 62 and a pivot pin 66 extends through the support lug 64 and apertures 68 in the support plates for pivotally mounting the guide tube 62 between the solid line position and the phantom line position as shown in FIG. 5. A support tube 70 is pivotally mounted between the support plates 60 in an identical manner.

A J-shaped arm 72 is slidably supported in the guide tube 62 and may be retained in any desired position of adjustment by means of a cam lock mechanism 74 mounted on the guide tube 62. The cam lock mechanism 74 is conventional in the art and accordingly is not disclosed in detail. The longer leg 76 of the J-shaped arm 72 is provided with an oversized end plate 78 which is welded thereto. The plate 78 will engage the guide tube 62 to prevent the removal of the J-shaped arm 72 from the guide tube. The cross member 80 of the J-shaped arm 72 extends at right angles to the leg 76 and is adapted to engage the surface of the tire opposite to the wheel chock 40. A short leg 82 is secured to the end of the cross member 80 for eliminating side slip of the tire when it is engaged by the cross member 80 and the chock 40 thereby providing a secure grasping of the tire on the vehicle. A plate 84, as shown in FIG. 5, is welded to the end of the short leg 82 to prevent the entry of dirt and debris. The J-shaped arm 72 may be moved from the solid line position shown in FIG. 5 where it would engage the tire of the vehicle to any extended position such as the phantom line position 72' shown in FIG. 5. A conventional tire engaging strap holder 86 is mounted on the longer leg of the J-shaped arm 72. A second J-shaped tire engaging arm 88 is shown slidably mounted in the guide tube 70. The details of the J-shaped arm 88 are identical to the J-shaped arm 72 and accordingly, a detailed description is not provided.

The guide tube 62 and the J-shaped arm 72 may be pivoted between the phantom line position and the solid line position shown in FIG. 5. When the assembly is in the phantom line position, the crossbar may be moved toward or away from the vehicle to bring the wheel chock 40 into and out of engagement with the tire of the vehicle. Upon engagement of the wheel chock 40 with the tire of the vehicle, the guide tube 62 and the arm 72 may be pivoted to the phantom line position 72' whereby the cross member 80 will be spaced from the surface of the tire opposite the surface of the tire engaging the wheel chock 40. Upon release of the cam lock 74, the J-shaped arm 72 may be moved to the solid line position shown in FIG. 5 wherein the cross member 80 will engage the tire. When the guide tube 62 and J-shaped arm 72 are in the solid line operative position, a pin 90 may be inserted in the hole 92 in the plate 56. The pin will be positioned adjacent the side of the guide tube 62 thereby preventing pivotal movement of the guide tube 62 from the solid line position as shown in FIG. 5. When the guide tube 62 and the J-shaped arm 72 are pivoted into the phantom line position as shown in FIG. 5, the guide pin 90 may be inserted into the hole 94 in the plate 56 to engage the opposite side of the guide tube 62 to prevent pivotal movement of the guide tube. A stop pin 96 is mounted on the guide plate 56 as shown in FIG. 5 to limit the pivotal movement of the guide tube 62 in the clockwise direction to prevent the cam lock 74 from engaging the tube 3, thereby preventing any damage to the cam lock mechanism. The guide tube 70 and J-shaped arm 88 may be operated in an identical manner to the operation of the guide tube 62 and the J-shaped arm 72. The pin 90 may be secured by a chain 98 to the tube 36 to prevent loss of the pin.

Figure 2:
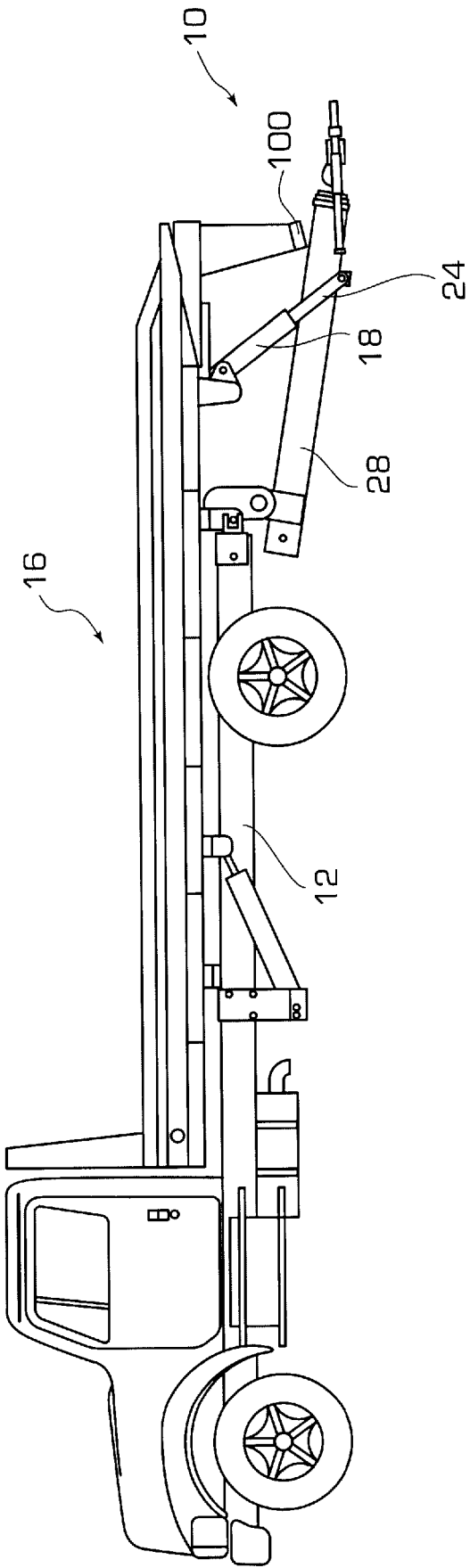
FIG. 2 is a side elevational view, similar to FIG. 1, showing the wheel lift head in a lowered position.
Figure 4:
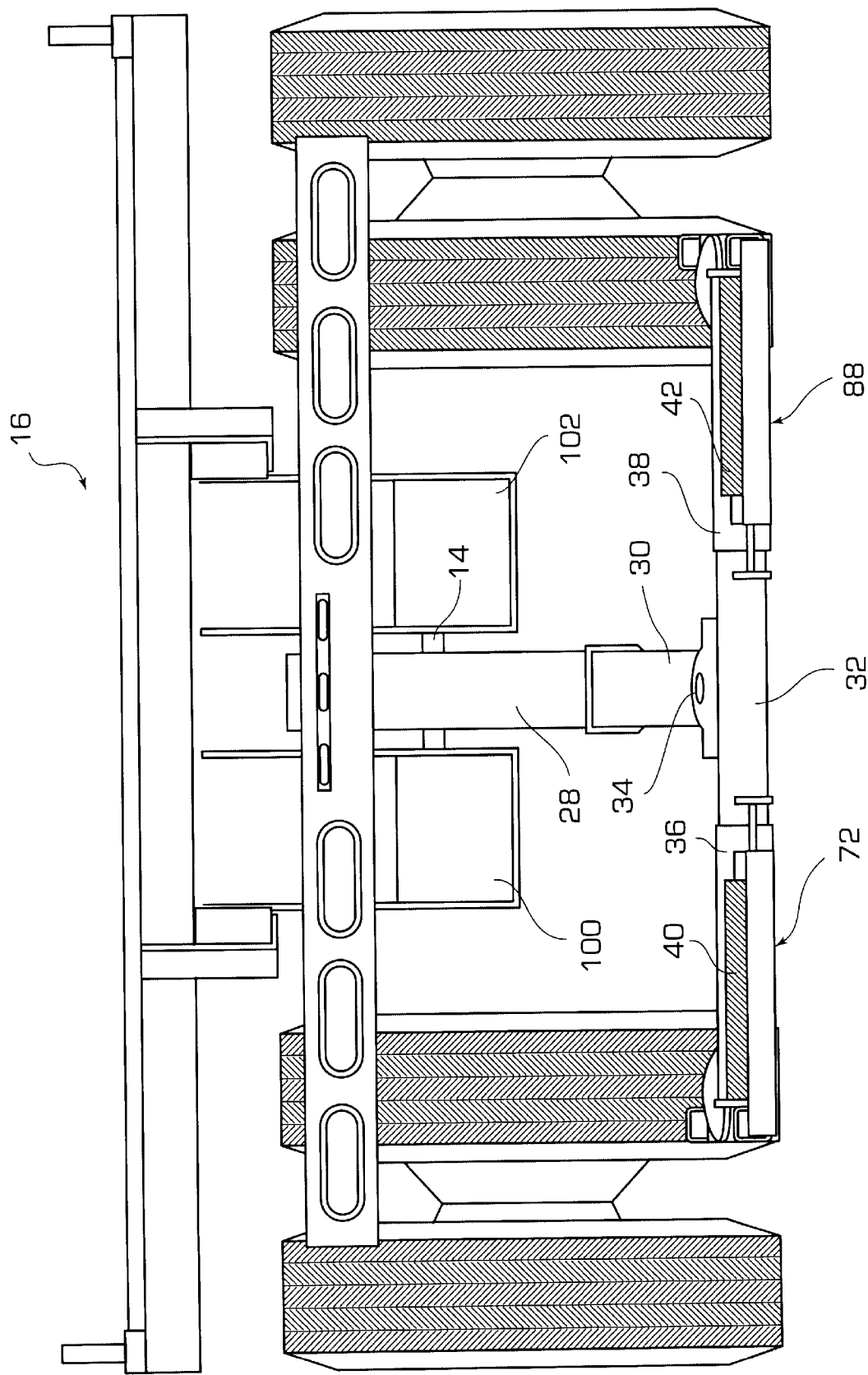
FIG. 4 is a rear elevational view of the truck showing the wheel lift head assembly in the lowered ground engaging position.

As discussed previously, the entire wheel lift head assembly 10 may be moved between a raised position as shown in FIG. 1 and a ground engaging position as shown in FIG. 2. A rear view of the wheel lift head assembly 10 is shown in FIG. 4 with the wheel lift head assembly in the ground engaging position. The wheel lift head assembly 10 is always located in this position when engagement and disengagement of the vehicle wheels takes place. The main support tube 28 is pivoted at 14 to the frame of the truck bed. A pair of ground engaging support members 100 and 102 depend from the rear end of the tiltable flatbed assembly 16 to provide additional support for the assembly 16 when it is in the tilted position in which a portion of the vehicle support member will be extended into engagement with the ground to facilitate the movement of a vehicle onto the flatbed assembly 16. The construction and operation of such a pivoted and extensible vehicle support frame 16 is old and well known in the art and is not discussed in detail herein.

Figure 7:
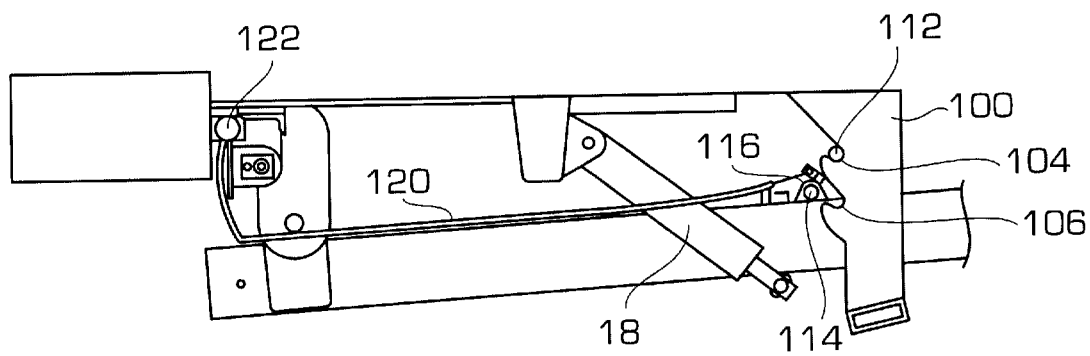
FIG. 7 is a side elevational view of a modified wheel lift head lifting arrangement having locking means to hold the head in the raised position.
Figure 8:
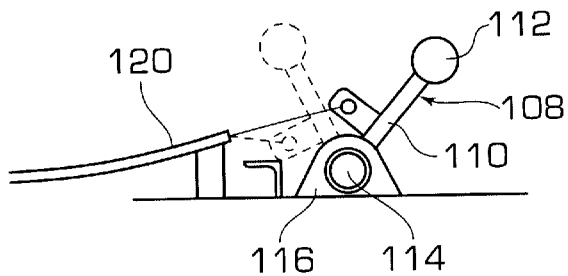
FIG. 8 is an enlarged detailed view of the pivoted locking member shown in FIG. 7.
Figure 9:
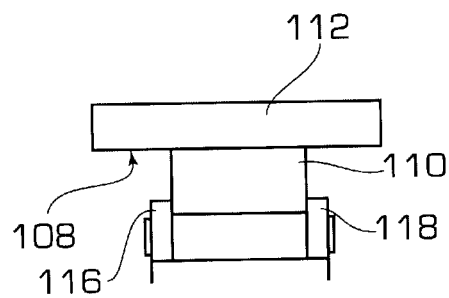
FIG. 9 is an end view of the pivoted locking member as shown in FIG. 8.

However, as shown in FIGS. 7–9, a safety lock mechanism may be provided for locking the wheel lift head assembly 10 in the raised position. The vehicle flatbed assembly supporting members 100 and 102 are each provided with a pair of notches 104 and 106 on a forwardly facing surface thereof as shown in FIG. 7. A T-shaped locking member 108 comprised of a base member 110 and a crossbar 112 is pivotally mounted at 114 to a pair of lugs 116, 118 on the support member 28 as shown in FIG. 9. Upon pivotal movement of the T-shaped locking member 108, the crossbar 112 will move into and out of engagement with a selected notch in the support members 100 and 102. The support member 102 is located directly behind the support member 100 as viewed in FIG. 7 and accordingly is not illustrated but the notches would be formed in the identical manner to the notches in the support member 100. A Bowden-type cable 120 is connected at one end to the pivoted locking member 108 and at the opposite end to an actuator 122. Upon movement of the actuator 122, the T-shaped locking member 108 can be pivoted into and out of engagement with a selected notch.

Thus, the locking assembly provides an added degree of safety when the vehicle is being supported by the wheel lift head assembly in the event there is a failure in the hydraulic system.

While the cam lock mechanism 74 is used for securing the J-shaped arm assembly 72 in the desired adjusted position, other types of locking members can be used. For example, a set screw 130 is used to adjustably secure the tube 36 to the end of the crossbar 32 and a locking nut 132 is threaded on the set screw 130 to prevent rotation of the set screw 130 when the lock nut 132 is in engagement with the tube 36. While the components may all be preferably made of steel, it is obvious that selected components could be made of other materials if so desired.

While the invention has been particularly shown and described with reference to preferred embodiments thereof, it will be understood by those in the art that the foregoing and other changes in form and details may be made therein without departing from the spirit and scope of the invention.

What is claimed is:

1. A wheel lift head assembly comprising support means adapted to be mounted adjacent a truck rear end for supporting a wheel lift head, a support arm adjustably supported on said support means, a crossbar pivotally mounted on said support arm, adjustment tubes slidably mounted on opposite ends of said crossbar, a guide tube pivotally mounted on an end of each adjustment tube outwardly of said crossbar, a J-shaped wheel engaging arm slidably supported in said guide tube, locking means for locking said guide tube in an operative position for engaging a vehicle wheel and for locking said guide tube in an inoperative position, first securing means for adjustably securing each adjustment tube on said crossbar, second securing means for adjustably securing said J-shaped arm in said guide tube and retaining means on said J-shaped arm to prevent withdrawal of said J-shaped arm from said guide tube, wherein each guide tube is pivotally mounted between a pair of spaced apart, horizontally extending plates secured to the end of each adjustment tube, apertures extending through said plates adjacent opposite sides of each guide tube in the operative and inoperative positions, respectively, and pin means selectively insertable in said holes for selectively locking said guide tube in said operative position and said inoperative position.

2. A wheel lift head assembly as set forth in claim 1, further comprising stop means mounted on said plates for limiting further movement of each guide tube in the inoperative position.

\* \* \* \* \*